US012173619B2

(12) United States Patent
Monahan

(10) Patent No.: US 12,173,619 B2
(45) Date of Patent: Dec. 24, 2024

(54) TURBINE COMPONENT HAVING PLATFORM COOLING CIRCUIT

(71) Applicant: Siemens Energy Global GmbH & Co. KG, Munich (DE)

(72) Inventor: Jeffrey Monahan, Oviedo, FL (US)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 18/304,443

(22) Filed: Apr. 21, 2023

(65) Prior Publication Data

US 2024/0011398 A1 Jan. 11, 2024

Related U.S. Application Data

(60) Provisional application No. 63/337,193, filed on May 2, 2022.

(51) Int. Cl.
*F01D 5/18* (2006.01)
*F01D 9/04* (2006.01)
*F01D 25/12* (2006.01)

(52) U.S. Cl.
CPC ............ *F01D 5/186* (2013.01); *F01D 9/041* (2013.01); *F01D 25/12* (2013.01); *F05D 2220/32* (2013.01); *F05D 2240/12* (2013.01); *F05D 2240/305* (2013.01); *F05D 2260/202* (2013.01)

(58) Field of Classification Search
CPC ........... F01D 5/186; F01D 25/12; F01D 9/041
See application file for complete search history.

(56) References Cited

U.S. PATENT DOCUMENTS

| | | | |
|---|---|---|---|
| 4,017,213 | A | 4/1977 | Przirembel |
| 5,997,245 | A | 12/1999 | Tomita et al. |
| 6,017,189 | A | 1/2000 | Judet et al. |
| 6,036,436 | A | 3/2000 | Fukuno et al. |
| 6,190,130 | B1 | 2/2001 | Fukue et al. |
| 7,686,581 | B2 | 3/2010 | Brittingham et al. |
| 8,096,772 | B2 | 1/2012 | Liang |
| 8,231,348 | B2 | 7/2012 | Torii et al. |
| 8,444,381 | B2 | 5/2013 | Seely |
| 8,517,680 | B1 | 8/2013 | Liang |

(Continued)

FOREIGN PATENT DOCUMENTS

| | | | |
|---|---|---|---|
| EP | 1074695 | A2 | 2/2001 |
| EP | 1132574 | A2 | 9/2001 |

(Continued)

*Primary Examiner* — Sabbir Hasan

(57) ABSTRACT

A turbine component includes an airfoil, a platform having a cold side, a hot side, a pressure side mate face, a suction side mate face, an upstream side face and a downstream side face with respect to a direction of a working flow. The airfoil is attached to the hot side of the platform. A platform pressure side cooling circuit is formed within the platform and positioned at a pressure side of the airfoil. The platform pressure side cooling circuit includes a plurality of pressures side mate face cooling holes defined at the pressure side mate face. A platform suction side cooling circuit is formed within the platform and positioned at a suction side of the airfoil. The platform suction side cooling circuit includes a plurality of downstream side face cooling holes defined at the downstream side face.

16 Claims, 5 Drawing Sheets

(56) References Cited

U.S. PATENT DOCUMENTS

| | | | | |
|---|---|---|---|---|
| 8,840,370 | B2 * | 9/2014 | Walunj | F01D 5/187 416/193 A |
| 9,021,816 | B2 | 5/2015 | Bergman et al. | |
| 9,222,364 | B2 | 12/2015 | Papple et al. | |
| 10,054,055 | B2 | 8/2018 | Spangler et al. | |
| 11,021,978 | B2 * | 6/2021 | Fukui | F01D 25/12 |
| 2002/0172590 | A1 | 11/2002 | Sreekanth et al. | |
| 2014/0064942 | A1 | 3/2014 | Porter et al. | |
| 2014/0096538 | A1 | 4/2014 | Boyer et al. | |
| 2021/0355879 | A1 | 11/2021 | Kittleson et al. | |

FOREIGN PATENT DOCUMENTS

| | | | |
|---|---|---|---|
| EP | 2469034 | A2 | 6/2012 |
| EP | 2597263 | A1 | 5/2013 |
| EP | 2610436 | A2 | 7/2013 |
| EP | 3361054 | A1 | 8/2018 |
| EP | 3670839 | A1 | 6/2020 |
| EP | 3854992 | A2 | 7/2021 |
| WO | 9417285 | A1 | 8/1994 |
| WO | 2019028208 | A1 | 2/2019 |

* cited by examiner

TURBINE COMPONENT HAVING PLATFORM COOLING CIRCUIT

BACKGROUND

A gas turbine engine typically includes a compressor section, a turbine section, and a combustion section disposed therebetween. The compressor section includes multiple stages of rotating compressor blades and stationary compressor vanes. The combustion section typically includes a plurality of combustors. The turbine section includes multiple stages of rotating turbine blades and stationary turbine vanes. Turbine blades and vanes often operate in a high temperature environment and are internally cooled.

BRIEF SUMMARY

In one aspect, a turbine component includes an airfoil including a pressure side and a suction side, a platform including a cold side, a hot side, a pressure side mate face, a suction side mate face, an upstream side face with respect to a direction of working flow, and a downstream side face with respect to the direction of the working flow, the airfoil attached to the hot side of the platform, a platform pressure side cooling circuit formed within the platform and positioned at the pressure side of the airfoil, the platform pressure side cooling circuit including a plurality of pressures side mate face cooling holes defined at the pressure side mate face, and a platform suction side cooling circuit formed within the platform and positioned at the suction side of the airfoil, the platform suction side cooling circuit including a plurality of downstream side face cooling holes defined at the downstream side face.

In one aspect, a turbine component includes a platform including a hot side and a cold side, an airfoil attached to the hot side of the platform, the airfoil including an internal cooling channel forming an internal cooling flow, and a platform cooling circuit formed within the platform and arranged to receive a cooling flow that is separate and distinct from the internal cooling flow.

In one aspect, a turbine component includes an airfoil including a pressure side and a suction side, a platform including a cold side, a hot side, a pressure side mate face, a suction side mate face, an upstream side face with respect to a direction of a working flow, and a downstream side face with respect to the direction of the working flow, the airfoil attached to the hot side of the platform, a platform pressure side cooling circuit formed within the platform and positioned at the pressure side of the airfoil, the platform pressure side cooling circuit including a platform pressure side impingement pocket to receive a cooling flow of the platform pressure side cooling circuit, a first platform pressure side cooling channel that is disposed downstream of and in fluid communication with the platform pressure side impingement pocket, a second platform pressure side cooling channel that is split from the first platform pressure side cooling channel and exits the platform at the pressure side mate face, a third platform pressure side cooling channel that is split from the first platform pressure side cooling channel, the third platform pressure side cooling channel including a serpentine platform cooling path including a first turn that turns toward the upstream side face defining an upward third platform pressure side cooling channel and a second turn that turns toward the downstream side face defining a downward third platform pressure side cooling channel, the downward third platform pressure side cooling channel exiting the platform at the pressure side mate face, a platform suction side cooling circuit formed within the platform and positioned at the suction side of the airfoil, the platform suction side cooling circuit including a platform suction side impingement pocket to receive a cooling flow of the platform suction side cooling circuit, a first platform suction side cooling channel that is disposed downstream of and in fluid communication with the platform suction side impingement pocket, a second platform suction side cooling channel that is split from the first platform suction side cooling channel and exits the platform at the downstream side face, and a third platform suction side cooling channel that is split from the first platform suction side cooling channel and exits the platform at the downstream side face.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
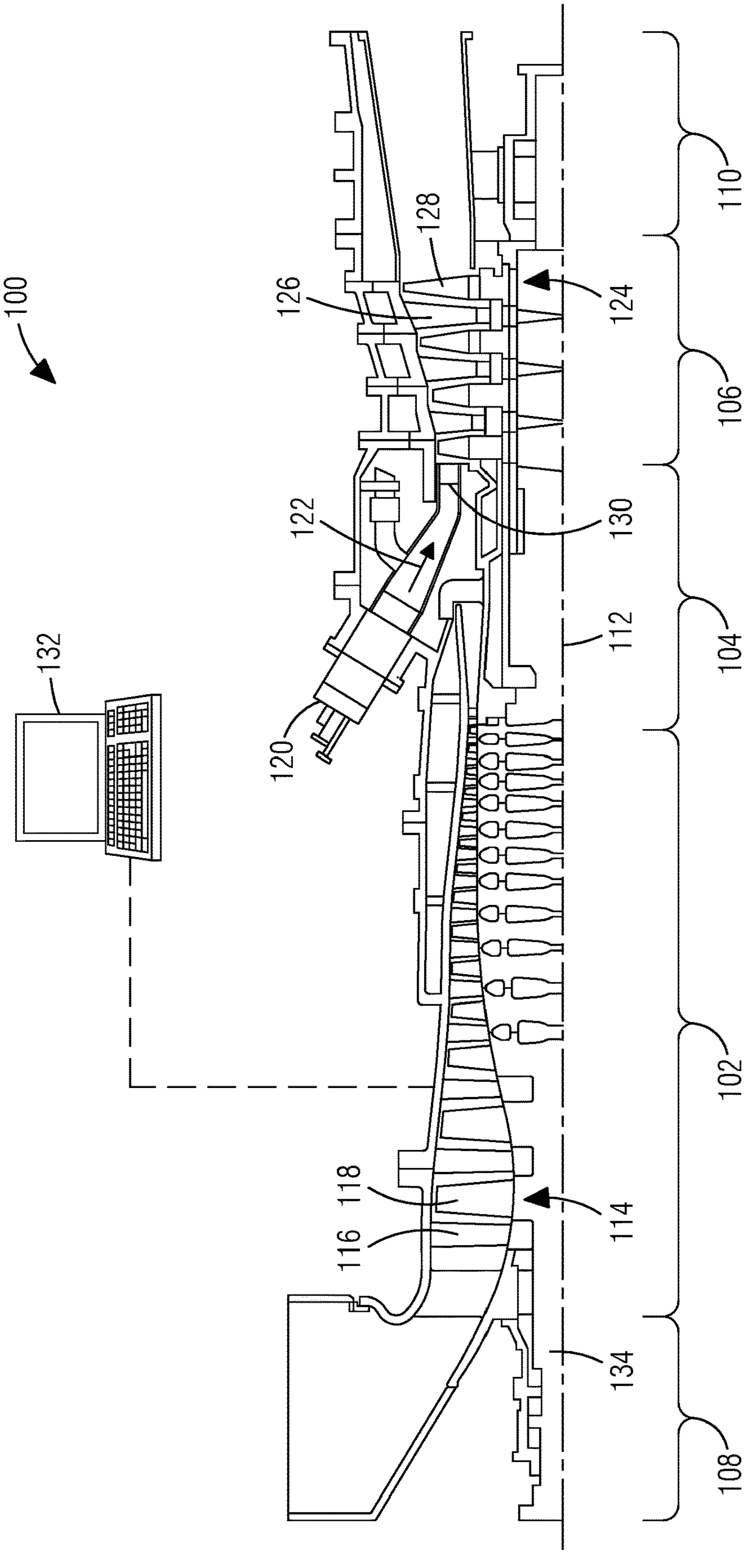
FIG. 1 is a longitudinal cross-sectional view of a gas turbine engine taken along a plane that contains a longitudinal axis or central axis.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms “including”, “having”, and “comprising”, as well as derivatives thereof, mean inclusion without limitation. The singular forms “a”, “an”, and “the” are intended to include the plural forms as well, unless the context clearly indicates otherwise. Further, the term “and/or” as used herein refers to and encompasses any and all possible combinations of one or more of the associated listed items. The term “or” is inclusive, meaning and/or, unless the context clearly indicates otherwise. The phrases “associated with” and “associated therewith” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms “first”, “second”, “third” and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

Also, in the description, the terms “axial” or “axially” refer to a direction along a longitudinal axis of a gas turbine engine. The terms “radial” or “radially” refer to a direction perpendicular to the longitudinal axis of the gas turbine engine. The terms “downstream” or “aft” refer to a direction along a flow direction. The terms “upstream” or “forward” refer to a direction against the flow direction.

In addition, the term “adjacent to” may mean that an element is relatively near to but not in contact with a further element or that the element is in contact with the further portion, unless the context clearly indicates otherwise. Further, the phrase “based on” is intended to mean “based, at least in part, on” unless explicitly stated otherwise. Terms “about” or “substantially” or like terms are intended to cover variations in a value that are within normal industry manufacturing tolerances for that dimension. If no industry standard is available, a variation of twenty percent would fall within the meaning of these terms unless otherwise stated.

FIG. 1 illustrates an example of a gas turbine engine 100 including a compressor section 102, a combustion section 104, and a turbine section 106 arranged along a central axis 112. The compressor section 102 includes a plurality of compressor stages 114 with each compressor stage 114 including a set of stationary compressor vanes 116 or adjustable guide vanes and a set of rotating compressor blades 118. A rotor 134 supports the rotating compressor blades 118 for rotation about the central axis 112 during operation. In some constructions, a single one-piece rotor 134 extends the length of the gas turbine engine 100 and is supported for rotation by a bearing at either end. In other constructions, the rotor 134 is assembled from several separate spools that are attached to one another or may include multiple disk sections that are attached via a bolt or plurality of bolts.

The compressor section 102 is in fluid communication with an inlet section 108 to allow the gas turbine engine 100 to draw atmospheric air into the compressor section 102. During operation of the gas turbine engine 100, the compressor section 102 draws in atmospheric air and compresses that air for delivery to the combustion section 104. The illustrated compressor section 102 is an example of one compressor section 102 with other arrangements and designs being possible.

In the illustrated construction, the combustion section 104 includes a plurality of separate combustors 120 that each operates to mix a flow of fuel with the compressed air from the compressor section 102 and to combust that air-fuel mixture to produce a flow of high temperature, high pressure combustion gases or exhaust gas 122. Of course, many other arrangements of the combustion section 104 are possible.

The turbine section 106 includes a plurality of turbine stages 124 with each turbine stage 124 including a number of stationary turbine vanes 126 and a number of rotating turbine blades 128. The turbine stages 124 are arranged to receive the exhaust gas 122 from the combustion section 104 at a turbine inlet 130 and expand that gas to convert thermal and pressure energy into rotating or mechanical work. The turbine section 106 is connected to the compressor section 102 to drive the compressor section 102. For gas turbine engines 100 used for power generation or as prime movers, the turbine section 106 is also connected to a generator, pump, or other devices to be driven. As with the compressor section 102, other designs and arrangements of the turbine section 106 are possible.

An exhaust portion 110 is positioned downstream of the turbine section 106 and is arranged to receive the expanded flow of exhaust gas 122 from the final turbine stage 124 in the turbine section 106. The exhaust portion 110 is arranged to efficiently direct the exhaust gas 122 away from the turbine section 106 to assure efficient operation of the turbine section 106. Many variations and design differences are possible in the exhaust portion 110. As such, the illustrated exhaust portion 110 is but one example of those variations.

A control system 132 is coupled to the gas turbine engine 100 and operates to monitor various operating parameters and to control various operations of the gas turbine engine 100. In preferred constructions, the control system 132 is typically micro-processor based and includes memory devices and data storage devices for collecting, analyzing, and storing data. In addition, the control system 132 provides output data to various devices including monitors, printers, indicators, and the like that allow users to interface with the control system 132 to provide inputs or adjustments. In the example of a power generation system, a user may input a power output setpoint and the control system 132 may adjust the various control inputs to achieve that power output in an efficient manner.

The control system 132 can control various operating parameters including, but not limited to variable inlet guide vane positions, fuel flow rates and pressures, engine speed, valve positions, generator load, and generator excitation. Of course, other applications may have fewer or more controllable devices. The control system 132 also monitors various parameters to assure that the gas turbine engine 100 is operating properly. Some parameters that are monitored may include inlet air temperature, compressor outlet temperature, and pressure, combustor outlet temperature, fuel flow rate, generator power output, bearing temperature, and the like. Many of these measurements are displayed for the user and are logged for later review should such a review be necessary.

Figure 2:
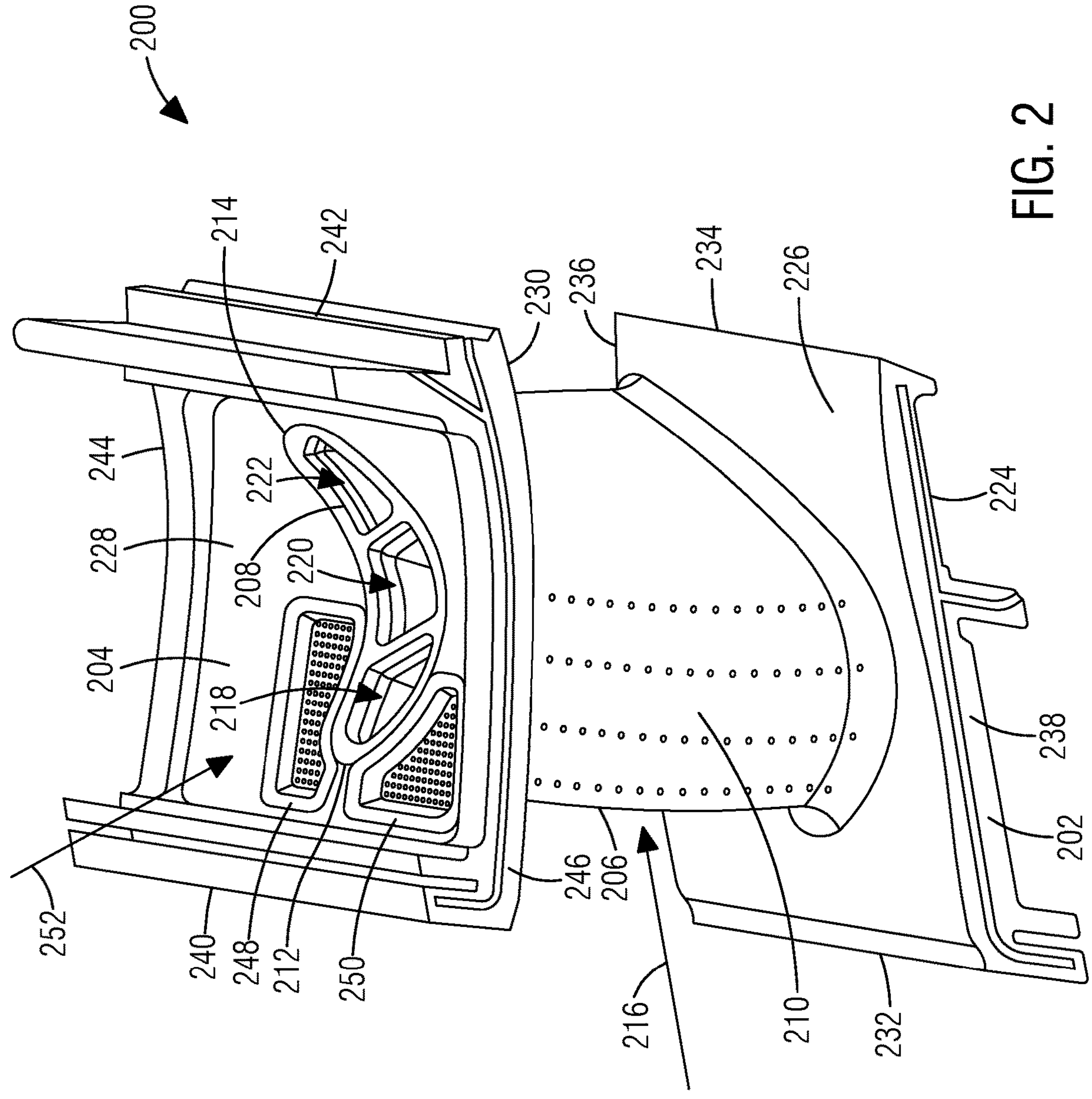
FIG. 2 is a perspective view of a turbine component in the gas turbine engine in FIG. 1.

FIG. 2 illustrates a perspective view of a turbine component 200. The turbine component 200 is the stationary turbine vane 126 in FIG. 1. While FIG. 2 illustrates the stationary turbine vane 126, other constructions can be applied to the rotating turbine blade 128 in FIG. 1.

The turbine component 200 includes platforms. The platforms include an inner platform 202 and an outer platform 204. The turbine component 200 includes an airfoil 206 that is disposed between the inner platform 202 and the outer platform 204. The airfoil 206 has a pressure side 208 and a suction side 210 joining at a leading edge 212 at an upstream side and a trailing edge 214 at a downstream side with respect to a direction of a working flow 216. The pressure side 208 has a generally concave shape. The suction side 210 has a generally convex shape. The pressure side 208 and the suction side 210 define an internal cooling space therebetween. The internal cooling space includes a forward internal cooling passage 218, a mid internal cooling passage 220, and an aft internal cooling passage 222 with respect to the direction of the working flow 216 with different arrangements including fewer or more passages being possible.

Each platform has a cold side and a hot side. The hot side is arranged such that it forms part of a hot gas path that is in direct contact with products of combustion. The products of combustion include the working flow 216. The cold side is opposite the hot side and is not exposed to direct contact with this hot gas. As shown in FIG. 2, the inner platform 202 has an inner platform cold side 224 and an inner platform hot side 226. The outer platform 204 has an outer platform cold side 228 and an outer platform hot side 230. The airfoil 206 is attached to the inner platform hot side 226 and the outer platform hot side 230.

Each platform has an upstream side face and a downstream side face with respect to the direction of the working flow 216. The inner platform 202 has an inner platform upstream side face 232 and an inner platform downstream side face 234. The outer platform 204 has an outer platform upstream side face 240 and an outer platform downstream side face 242.

Each platform has a suction side mate face and a pressure side mate face that are each generally adjacent to another turbine component 200 in a circumferential direction around the rotor 134 in FIG. 1. The inner platform 202 has an inner platform suction side mate face 238 and an inner platform pressure side mate face 236. The outer platform 204 has an outer platform pressure side mate face 244 and an outer platform suction side mate face 246.

Each platform includes a platform impingement plate that covers a platform impingement pocket. The platform impingement plate includes a platform pressure side impingement plate that covers a platform pressures platform pressure side impingement pocket. The platform impingement plate includes a platform suction side impingement plate that covers a platform suction side impingement pocket. As shown in FIG. 2, the outer platform 204 includes an outer platform pressure side impingement plate 248 disposed at the outer platform cold side 228 and an outer platform suction side impingement plate 250 disposed at the outer platform cold side 228. The outer platform pressure side impingement plate 248 is placed adjacent to the pressure side 208. The outer platform suction side impingement plate 250 is placed adjacent to the suction side 210. The outer platform 204 has an outer platform pressure side impingement pocket 402 (shown in FIG. 4) that is covered by the outer platform pressure side impingement plate 248 and an outer platform suction side impingement pocket 404 (shown in FIG. 4) that is covered by the outer platform suction side impingement plate 250. The outer platform pressure side impingement plate 248 and the outer platform suction side impingement plate 250 define a plurality of impingement cooling holes to provide for the passage of a flow of cooling air 252 into the outer platform pressure side impingement pocket 402 and the outer platform suction side impingement pocket 404.

Figure 3:
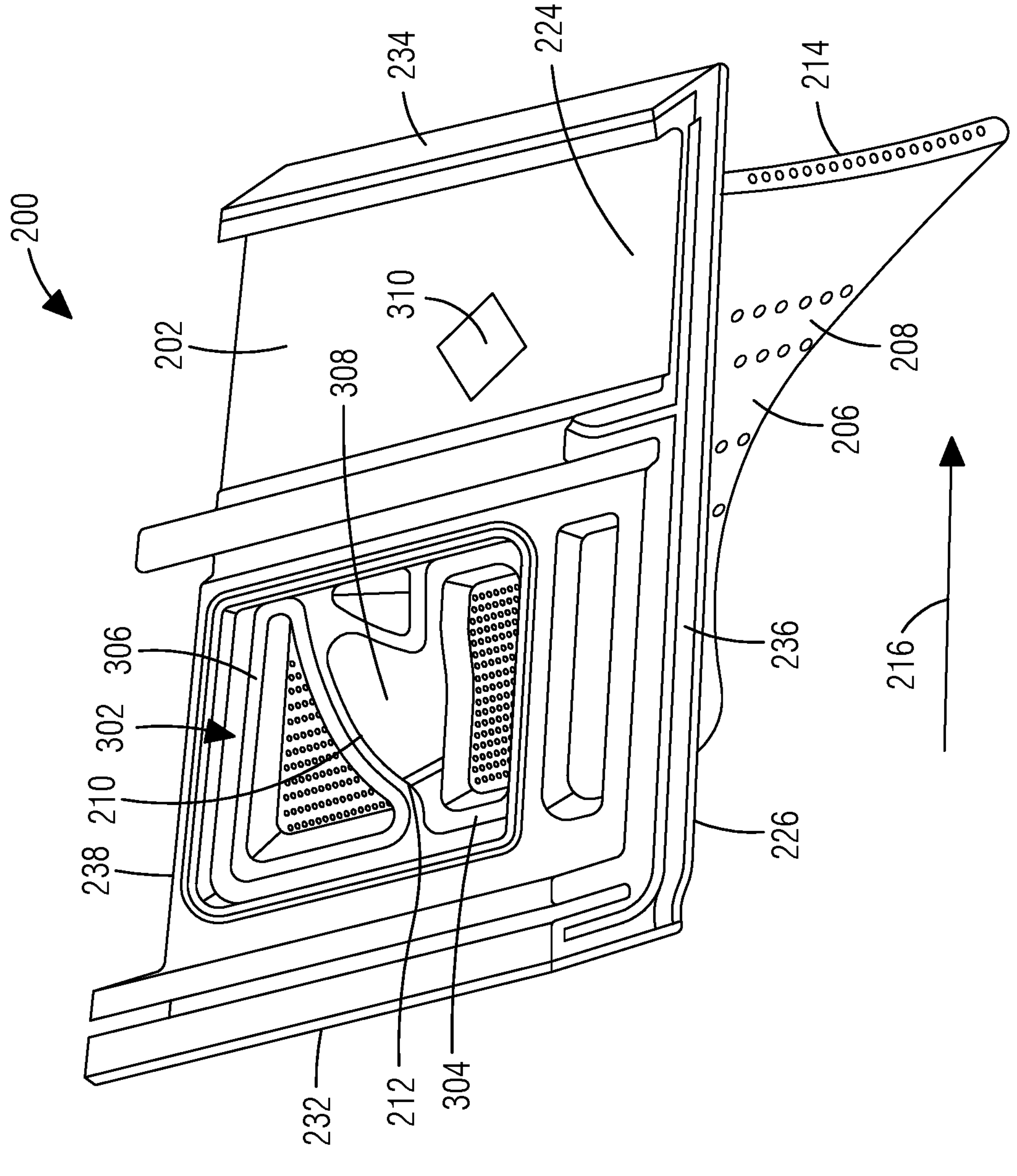
FIG. 3 is a perspective view of a portion of the turbine component in FIG. 2, looking from a cold side of an inner platform.

FIG. 3 illustrate a perspective view of a portion of the turbine component 200 looking from the inner platform cold side 224. The inner platform 202 includes an inner platform plenum 302 defined at the inner platform cold side 224. The inner platform plenum 302 is covered by a plenum cover plate (not shown) to maintain the cooling air 252 in the inner platform plenum 302.

The inner platform 202 includes an inner platform pressure side impingement plate 304 and an inner platform suction side impingement plate 306 that are disposed within the inner platform plenum 302. The inner platform pressure side impingement plate 304 is placed adjacent to the pressure side 208. The inner platform suction side impingement plate 306 is placed adjacent to suction side 210. The inner platform 202 has an inner platform pressure side impingement pocket 502 (shown in FIG. 5) that is covered by the inner platform pressure side impingement plate 304 and an inner platform suction side impingement pocket 504 (shown in FIG. 5) that is covered by the inner platform suction side impingement plate 306. The inner platform pressure side impingement plate 304 and the inner platform suction side impingement plate 306 define a plurality of impingement cooling holes to provide for the passage of the cooling air 252 into the inner platform pressure side impingement pocket 502 and the inner platform suction side impingement pocket 504.

The inner platform 202 includes a forward internal cooling passage cover plate 308 that covers the forward internal cooling passage 218 at the inner platform cold side 224. The forward internal cooling passage cover plate 308 may be coupled to the inner platform pressure side impingement plate 304 forming a single piece, or a separate piece from the inner platform pressure side impingement plate 304. The inner platform 202 includes an aft internal cooling passage cover plate 310 that covers the aft internal cooling passage 222 at the inner platform cold side 224.

Each platform includes a platform cooling circuit that is formed within the platform between the cold side and the hot side. The platform cooling circuit includes a platform pressure side cooling circuit that is positioned at the pressure side 208 of the airfoil 206 and a platform suction side cooling circuit that is positioned at the suction side 210 of the airfoil 206. The platform pressure side cooling circuit includes a plurality of platform pressure side cooling channels. The platform suction side cooling circuit includes a plurality of platform suction side cooling channels. Each platform includes a plurality of downstream side face cooling holes that are defined at the downstream side face and a plurality of pressures side mate face cooling holes that are defined at the pressure side mate face. The plurality of downstream side face cooling holes and the plurality of pressures side mate face cooling hole provide passages for discharge of the cooling air 252 from the platform.

Figure 4:
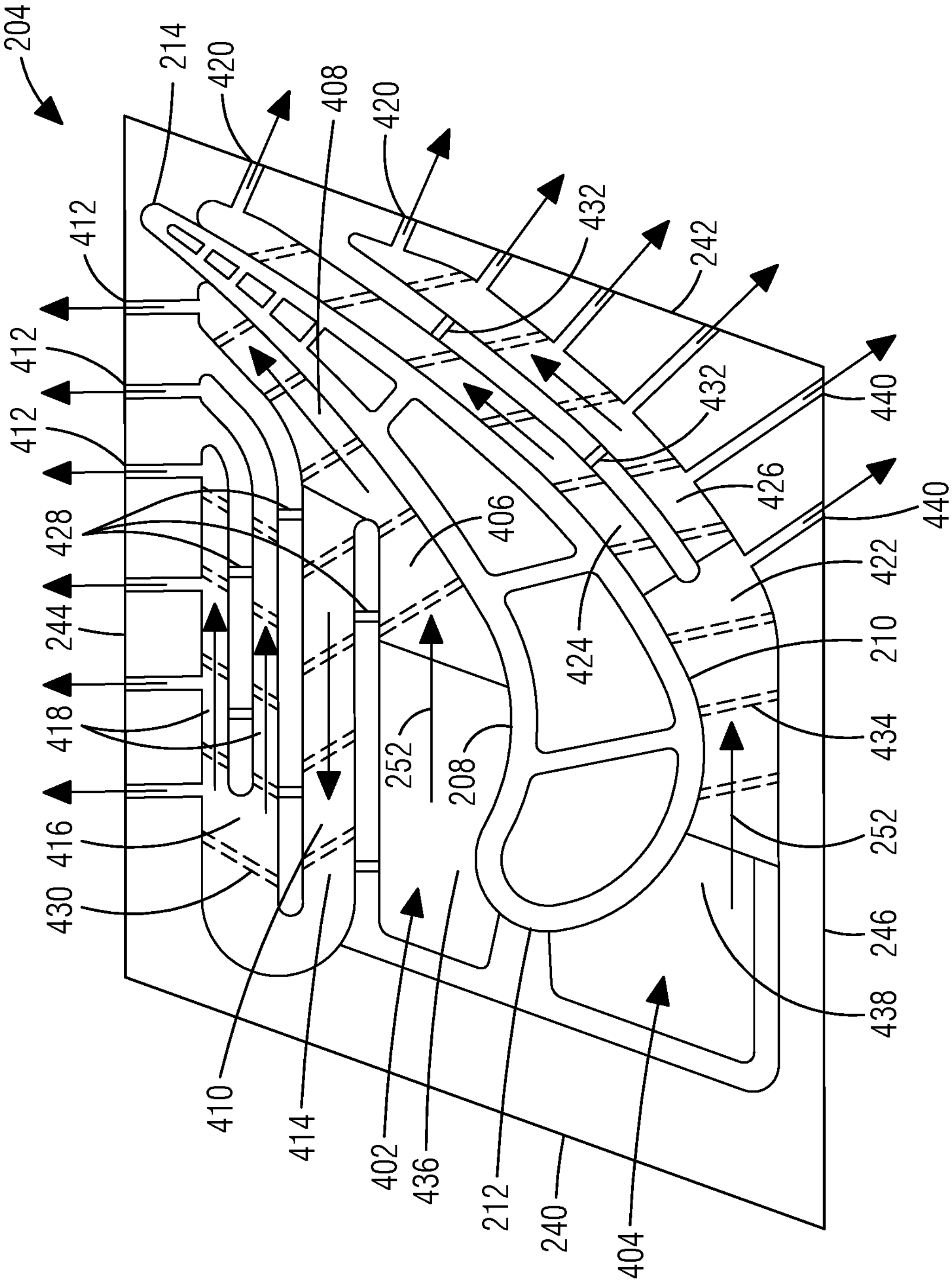
FIG. 4 is a section view of the outer platform in FIG. 2, looking from the cold side of the outer platform.

FIG. 4 illustrates a section view of the outer platform 204 looking from the outer platform cold side 228. The outer platform 204 includes an outer platform cooling circuit that is formed with the outer platform 204 between the outer platform cold side 228 and the outer platform hot side 230.

The outer platform cooling circuit includes an outer platform pressure side cooling circuit 436 that is arranged at the pressure side 208. The outer platform pressure side cooling circuit 436 includes an outer platform pressure side impingement pocket 402, a first outer platform pressure side cooling channel 406, a second outer platform pressure side cooling channel 408, and a third outer platform pressure side cooling channel 410. The outer platform pressure side impingement pocket 402 reserves the cooling air 252 that passes through the impingement cooling holes of the outer platform pressure side impingement plate 248. The cooling air 252 in the outer platform pressure side impingement pocket 402 is served as a cooling flow to the outer platform pressure side cooling circuit 436. The outer platform pressure side cooling circuit 436 includes a plurality of outer platform pressure side mate face cooling holes 412 that are defined at the outer platform pressure side mate face 244 to discharge the cooling air 252 from the outer platform pressure side cooling circuit 436 at the outer platform pressure side mate face 244.

The first outer platform pressure side cooling channel 406 is disposed downstream of and in fluid communication with the outer platform pressure side impingement pocket 402 to receive the cooling air 252 from the outer platform pressure side impingement pocket 402. The first outer platform pressure side cooling channel 406 extends in the outer platform 204 along the pressure side 208 toward the trailing edge 214. The first outer platform pressure side cooling channel 406 is split into a second outer platform pressure side cooling channel 408 and a third outer platform pressure side cooling channel 410 before it reaches the trailing edge 214. The split may occur near the middle portion of the pressure side 208. The second outer platform pressure side cooling channel 408 continues extending in the outer platform 204 along the pressure side 208 and exits the outer platform 204 at the outer platform pressure side mate face 244 through the outer platform pressure side mate face cooling holes 412. FIG. 4 illustrates one outer platform pressure side mate face cooling hole 412 is provided to discharge the cooling air 252 from the second outer platform pressure side cooling channel 408. In other constructions, more than one outer platform pressure side mate face cooling holes 412 may be provided to discharge the cooling air 252 from the second outer platform pressure side cooling channel 408.

The third outer platform pressure side cooling channel 410 extends in the outer platform 204 forming a serpentine outer platform cooling path. As used herein, the term "serpentine" refers to a flow path that includes at least one turn of greater than 90 degrees. The third outer platform pressure side cooling channel 410 includes a first turn that turns toward the outer platform upstream side face 240 defining an upward third outer platform pressure side cooling channel 414. The third outer platform pressure side cooling channel 410 includes a second turn that turns toward the outer platform downstream side face 242 defining a downward third outer platform pressure side cooling channel 416. The upward third outer platform pressure side cooling channel 414 and the downward third outer platform pressure side cooling channel 416 are parallel to each other. The downward third outer platform pressure side cooling channel 416 is split into two sub downward third outer platform pressure side cooling channels 418 before it reaches the trailing edge 214. A width of each of the two sub downward third outer platform pressure side cooling channels 418 is narrower than a width of the upward third outer platform pressure side cooling channel 414. The two sub downward third outer platform pressure side cooling channels 418 are parallel to each other. Each of the two sub downward third outer platform pressure side cooling channels 418 exits the outer platform 204 at the outer platform pressure side mate face 244 through the outer platform pressure side mate face cooling holes 412.

The outer platform pressure side cooling circuit 436 includes a plurality of outer platform pressure side bars 428 that are disposed between and connect adjacent outer platform pressure side cooling channels. The plurality of outer platform pressure side bars 428 may connect the upward third outer platform pressure side cooling channel 414 with the downward third outer platform pressure side cooling channel 416, connect the upward third outer platform pressure side cooling channel 414 with one of the sub downward third outer platform pressure side cooling channels 418 that adjacent to the upward third outer platform pressure side cooling channel 414, or connect the two sub downward third outer platform pressure side cooling channels 418. Each of the plurality of outer platform pressure side bars 428 is hollow and can serve as a bypass channel to bypass the cooling air 252 between the connected outer platform pressure side cooling channels. The plurality of outer platform pressure side bars 428 may also disposed between and connect the outer platform pressure side impingement pocket 402 with the upward third outer platform pressure side cooling channel 414 to bypass the cooling air 252 therebetween.

The outer platform pressure side cooling circuit 436 includes a plurality of outer platform pressure side turbulator ribs 430 that are disposed in the outer platform pressure side cooling channels. The outer platform pressure side turbulator ribs 430 may be disposed in the first outer platform pressure side cooling channel 406, or the second outer platform pressure side cooling channel 408, or the third outer platform pressure side cooling channel 410, etc. FIG. 4 illustrates the outer platform pressure side turbulator ribs 430. In other constructions, it is possible to replace or combine the outer platform pressure side turbulator ribs 430 with other types of heat transfer augmentation features, such as pin fins, impingement pins or dimples, etc.

The outer platform cooling circuit includes an outer platform suction side cooling circuit 438 that is arranged adjacent to the suction side 210. The outer platform suction side cooling circuit 438 includes an outer platform suction side impingement pocket 404 and a first outer platform suction side cooling channel 422. The outer platform suction side impingement pocket 404 reserves the cooling air 252 from the impingement cooling holes of the outer platform suction side impingement plate 250. The cooling air 252 in the outer platform suction side impingement pocket 404 is served as a cooling flow to the outer platform suction side cooling circuit 438. The outer platform suction side cooling circuit 438 includes a plurality of outer platform downstream side face cooling holes 420 that are defined at the outer platform downstream side face 242 to provide for the discharge of the cooling air 252 from the outer platform suction side cooling circuit 438 at the outer platform downstream side face 242. The outer platform suction side cooling circuit 438 also includes a plurality of outer platform suction side mate face cooling holes 440 that are defined at the outer platform suction side mate face 246 to provide for the discharge of the cooling air 252 from the outer platform suction side cooling circuit 438 at the outer platform suction side mate face 246.

The first outer platform suction side cooling channel 422 is disposed downstream of and in fluid communication with the outer platform suction side impingement pocket 404 to receive the cooling air 252 from the outer platform suction side impingement pocket 404. The first outer platform suction side cooling channel 422 extends in the outer platform 204 along the suction side 210 toward the trailing edge 214. The first outer platform suction side cooling channel 422 is split into a second outer platform suction side cooling channel 424 and a third outer platform suction side cooling channel 426 before it reaches the trailing edge 214. The split may occur near the middle portion of the suction side 210. The second outer platform suction side cooling channel 424 and the third outer platform suction side cooling channel 426 are parallel to each other. The second outer platform suction side cooling channel 424 and the third outer platform suction side cooling channel 426 continue extending in the outer platform 204 along the suction side 210 and exit the outer platform 204 at the outer platform downstream side face 242 through the plurality of outer platform downstream side face cooling holes 420. The cooling air 252 can also be discharged from the outer platform suction side cooling circuit 438 through the outer platform suction side mate face cooling holes 440.

The outer platform suction side cooling circuit 438 includes a plurality of outer platform suction side bars 432 that are disposed between and connect the second outer platform suction side cooling channel 424 and the third outer platform suction side cooling channel 426. Each of the plurality of outer platform suction side bars 432 is hollow and can serve as a bypass channel to bypass the cooling air 252 between the second outer platform suction side cooling channel 424 and the third outer platform suction side cooling channel 426.

The outer platform suction side cooling circuit 438 include a plurality of outer platform suction side turbulator ribs 434 that are disposed in the second outer platform suction side cooling channel 424 and the third outer platform suction side cooling channel 426. FIG. 4 illustrates the outer platform suction side turbulator ribs 434. In other constructions, it is possible to replace or combine the outer platform suction side turbulator ribs 434 with other types of heat transfer augmentation features, such as pin fins, impingement pins or dimples, etc.

Figure 5:
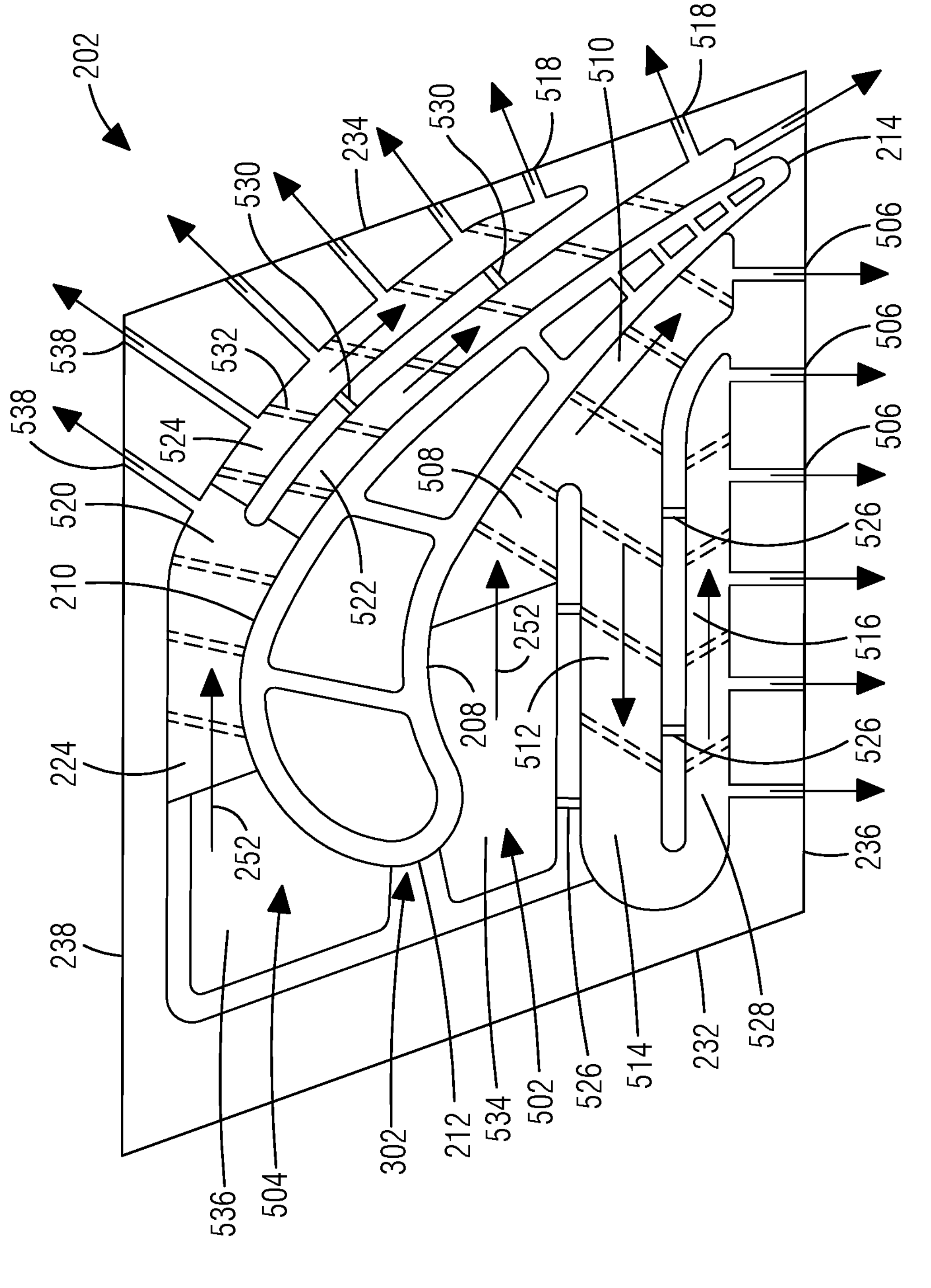
FIG. 5 is a section view of the inner platform in FIG. 3, looking from the code side of the inner platform.

FIG. 5 illustrates a section view of the inner platform 202 looking from the inner platform cold side 224. The inner platform 202 includes an inner platform cooling circuit that is formed with the inner platform 202 between the inner platform cold side 224 and the inner platform hot side 226.

The inner platform cooling circuits includes an inner platform pressure side cooling circuit 534 that is arranged at the suction side 210. The inner platform pressure side cooling circuit 534 includes an inner platform pressure side impingement pocket 502 and a first inner platform pressure side cooling channel 508. The inner platform pressure side impingement pocket 502 is disposed within the inner platform plenum 302 and reserves the cooling air 252 that passes through the impingement cooling holes of the inner platform pressure side impingement plate 304. The cooling air 252 in the inner platform pressure side impingement pocket 502 is served as a cooling flow to the inner platform pressure side cooling circuit 534. inner platform pressure side cooling circuit 534 includes a plurality of inner platform pressure side mate face cooling holes 506 that are defined at the inner platform pressure side mate face 236 to provide for the discharge of the cooling air 252 from the inner platform pressure side cooling circuit 534 at the inner platform pressure side mate face 236.

The first inner platform pressure side cooling channel 508 is disposed downstream of and in fluid communication with the inner platform pressure side impingement pocket 502 to receive the cooling air 252 from the inner platform pressure side impingement pocket 502. The first inner platform pressure side cooling channel 508 extends in the inner platform 202 along the pressure side 208 toward the trailing edge 214. The first inner platform pressure side cooling channel 508 is split into a second inner platform pressure side cooling channel 510 and a third inner platform pressure side cooling channel 512 before it reaches the trailing edge 214. The split may occur near the middle portion of the pressure side 208. The second inner platform pressure side cooling channel 510 continues extending in the inner platform 202 along the pressure side 208 and exits the inner platform 202 at the inner platform pressure side mate face 236 through one of the plurality of inner platform pressure side mate face cooling holes 506. FIG. 5 illustrates one inner platform pressure side mate face cooling hole 506 is provided to discharge the cooling air 252 from the second inner platform pressure side cooling channel 510. In other constructions, more than one inner platform pressure side mate face cooling holes 506 may be provided to discharge the cooling air 252 from the second inner platform pressure side cooling channel 510.

The third inner platform pressure side cooling channel 512 extends in the inner platform 202 forming a serpentine inner platform cooling path. As used herein, the term "serpentine" refers to a flow path that includes at least one turn of greater than 90 degrees. The third inner platform pressure side cooling channel 512 includes a first turn that turns toward the inner platform upstream side face 232 defining an upward third inner platform pressure side cooling channel 514. The third inner platform pressure side cooling channel 512 includes a second turn that turns toward the inner platform downstream side face 234 defining a downward third inner platform pressure side cooling channel 516. A width of the downward third inner platform pressure side cooling channel 516 is narrower than a width of the upward third inner platform pressure side cooling channel 514. The upward third inner platform pressure side cooling channel 514 and the downward third inner platform pressure side cooling channel 516 are parallel to one another. The downward third inner platform pressure side cooling channel 516 extends in the inner platform 202 and exits the inner platform 202 at the inner platform pressure side mate face 236 through some other of the plurality of inner platform pressure side mate face cooling holes 506. FIG. 5 illustrates two inner platform pressure side mate face cooling holes 506 are provided for discharge the cooling air 252 from the downward third inner platform pressure side cooling channel 516. In other constructions, more than two inner platform pressure side mate face cooling holes 506 may be provided to discharge the cooling air 252 from the downward third inner platform pressure side cooling channel 516.

The inner platform pressure side cooling circuit 534 includes a plurality of inner platform pressure side bars 526 that are disposed between and connect adjacent inner platform pressure side cooling channels. The plurality of inner platform pressure side bars 526 may connect the first inner platform pressure side cooling channel 508 with the upward third inner platform pressure side cooling channel 514 or connect the upward third inner platform pressure side cooling channel 514 with the downward third inner platform pressure side cooling channel 516. Each of the inner platform pressure side bars 526 is hollow and can serve as a bypass channel to bypass the cooling air 252 between the connected inner platform pressure side cooling channels. The plurality of inner platform pressure side bars 526 may also connect the inner platform pressure side impingement pocket 502 with the first inner platform pressure side cooling channel 508 to bypass the cooling air 252 therebetween.

The inner platform pressure side cooling circuit 534 includes a plurality of inner platform pressure side turbulator ribs 528 that are disposed in the inner platform pressure side cooling channels. The inner platform pressure side turbulator ribs 528 may be disposed in the first inner platform pressure side cooling channel 508, or the second inner platform pressure side cooling channel 510, or the third inner platform pressure side cooling channel 512. FIG. 5 illustrates the inner platform pressure side turbulator ribs 528. In other constructions, it is possible to replace or combine the inner platform pressure side turbulator ribs 528 with other types of heat transfer augmentation features, such as pin fins, impingement pins or dimples, etc.

The inner platform cooling circuit includes an inner platform suction side cooling circuit 536 that is arranged adjacent to the suction side 210. The inner platform suction side cooling circuit 536 includes an inner platform suction side impingement pocket 504 and a first inner platform suction side cooling channel 520. The inner platform suction side impingement pocket 504 reserves the cooling air 252 that passes through the impingement cooling holes of the inner platform suction side impingement plate 306. The cooling air 252 in the inner platform suction side impingement pocket 504 is served as a cooling flow to the inner platform suction side cooling circuit 536. The inner platform suction side cooling circuit 536 includes a plurality of inner platform downstream side face cooling holes 518 that are defined at the inner platform downstream side face 234 to provide for the discharge of the cooling air 252 from the inner platform suction side cooling circuit 536 at the inner platform downstream side face 234. The inner platform suction side cooling circuit 536 also includes a plurality of inner platform suction side mate face cooling holes 538 that are defined at the inner platform suction side mate face 238 to provide for the discharge of the cooling air 252 from the inner platform suction side mate face 238.

The first inner platform suction side cooling channel 520 is disposed downstream of and in a fluid communication with the inner platform suction side impingement pocket 504 to receive the cooling air 252 from the inner platform suction side impingement pocket 504. The first inner platform suction side cooling channel 520 extends in the inner platform 202 along the suction side 210 toward the trailing edge 214. The first inner platform suction side cooling channel 520 is split into a second inner platform suction side cooling channel 522 and a third inner platform suction side cooling channel 524 before it reaches the trailing edge 214. The split may occur near the middle portion of the suction side 210. The second inner platform suction side cooling channel 522 and the third inner platform suction side cooling channel 524 are parallels to each other. The second inner platform suction side cooling channel 522 and the third inner platform suction side cooling channel 524 continue extending in the inner platform 202 along the suction side 210 and exit the inner platform 202 at the inner platform downstream side face 234 through the plurality of inner platform downstream side face cooling holes 518. The cooling air 252 can also be discharged from the inner platform suction side cooling circuit 536 through the inner platform suction side mate face cooling holes 538.

The inner platform suction side cooling circuit 536 includes a plurality of inner platform suction side bars 530 that are disposed between and connect the second inner platform suction side cooling channel 522 with the third inner platform suction side cooling channel 524. Each of the inner platform suction side bars 530 is hollow and can serve as a bypass channel to bypass pass the cooling air 252 between the second inner platform suction side cooling channel 522 and the third inner platform suction side cooling channel 524.

The inner platform suction side cooling circuit 536 includes a plurality of inner platform suction side turbulator ribs 532 that are disposed in the inner platform suction side cooling channels. The inner platform suction side turbulator ribs 532 may be disposed in the first inner platform suction side cooling channel 520, or in the second inner platform suction side cooling channel 522, or in the third inner platform suction side cooling channel 524. FIG. 5 illustrates the inner platform suction side turbulator ribs 532. In other constructions, it is possible to replace or combine the inner platform suction side turbulator ribs 532 with other types of heat transfer augmentation features, such as pin fins, impingement pins or dimples, etc.

In operation of the gas turbine engine 100, with reference to FIG. 1, FIG. 2, FIG. 3, FIG. 4, and FIG. 5, the cooling air 252 impinges the outer platform pressure side impingement plate 248 and the outer platform suction side impingement plate 250 to cool the outer platform 204 from the outer platform cold side 228. The cooling air 252 then passes through the plurality of impingement cooling holes and is reserved in the outer platform pressure side impingement pocket 402 and the outer platform suction side impingement pocket 404 that forms a cooling flow for the outer platform pressure side cooling circuit and the outer platform suction side cooling circuit. The cooling flow is separate and distinct from an internal cooling flow that cools the forward internal cooling passage 218, the mid internal cooling passage 220, and the aft internal cooling passage 222.

The cooling air 252 then enters the outer platform pressure side cooling circuit 436 and the outer platform suction side cooling circuit 438 to cool the outer platform 204. The cooling air 252 then exits the outer platform 204 from the outer platform pressure side cooling circuit 436 through the plurality of outer platform pressure side mate face cooling holes 412 at the outer platform pressure side mate face 244 to cool a gap between the outer platform pressure side mate face 244 and an outer platform suction side mate face 246 of an adjacent turbine component 200 in the circumferential direction. The cooling air 252 also exits the outer platform 204 from the outer platform suction side cooling circuit 438 through the plurality of outer platform downstream side face cooling holes 420 at the outer platform downstream side face 242 to cool a gap between the outer platform downstream side face 242 and an outer platform upstream side face 240 of an adjacent downstream turbine component 200 with respect to the direction of the working flow 216. The exit locations are placed and split to achieve a desired cooling at the outer platform downstream side face 242 and the outer platform pressure side mate face 244. The cooling air 252 may also flow to the outer platform hot side 230 through holes in the outer platform 204 to film cool the outer platform hot side 230. The plurality of outer platform pressure side turbulator ribs 430 and the plurality of outer platform suction side turbulator ribs 434 enhance the cooling effect of the outer platform cooling circuit. The plurality of outer platform pressure side bars 428 and the plurality of outer platform suction side bars 432 may bypass a portion of the cooling air 252 from an upstream outer platform cooling channel to a connected downstream outer platform cooling channel with respect to a flow direction of the cooling air 252. The portion of the bypassed cooling air 252 has a less temperature than the cooling air 252 that flows through the entire upstream outer platform cooling channel to provide better cooling to the connected downstream outer platform cooling channel.

The cooling air 252 passes through the forward internal cooling passage 218, the mid internal cooling passage 220, and the aft internal cooling passage 222 from the outer platform 204 to the inner platform 202. The cooling air 252 in the forward internal cooling passage 218 is maintained in the forward internal cooling passage 218 by the forward internal cooling passage cover plate 308 as an internal cooling flow. The cooling air 252 in the aft internal cooling passage 222 is maintained in the aft internal cooling passage 222 by the aft internal cooling passage cover plate 310 as the internal cooling flow. The cooling air 252 in the mid internal cooling passage 220 flows out of the mid internal cooling passage 220 and impinges the inner platform pressure side impingement plate 304 and the inner platform suction side impingement plate 306 to cool the inner platform 202 at the upstream side from the inner platform cold side 224. The cooling air 252 then passes through the impingement cooling holes and is reserved in the inner platform pressure side impingement plate 304 and the inner platform suction side impingement plate 306 that is served as a cooling flow for the inner platform cooling circuit. The cooling flow is separate and distinct from the internal cooling flow.

The cooling air 252 then enters the inner platform pressure side cooling circuit 534 and the inner platform suction side cooling circuit 536 to cool the inner platform 202. The cooling air 252 then exits the inner platform 202 from the second inner platform pressure side cooling channel 510 and the downward third inner platform pressure side cooling channel 516 through the plurality of inner platform pressure side mate face cooling holes 506 to cool a gap between the inner platform pressure side mate face 236 and an inner platform suction side mate face 238 of an adjacent turbine component 200 in the circumferential direction. The cooling air 252 may also exits the inner platform 202 from the second inner platform suction side cooling channel 522 and the third inner platform suction side cooling channel 524 through the plurality of inner platform downstream side face cooling holes 518 to cool a gap between the inner platform downstream side face 234 and an inner platform upstream side face 232 of an adjacent downstream turbine component 200 with respect to the direction of the working flow 216. The exit locations are placed and split to achieve a desired cooling at the inner platform downstream side face 234 and the inner platform pressure side mate face 236. The cooling air 252 may also flow to the inner platform hot side 226 through holes in the inner platform 202 to film cool the inner platform 202. The plurality of inner platform pressure side turbulator ribs 528 and the plurality of inner platform suction side turbulator ribs 532 enhance the cooling effect of the inner platform cooling circuit. The plurality of inner platform pressure side bars 526 and the plurality of inner platform suction side bars 530 may bypass a portion of the cooling air 252 from an upstream inner platform cooling channel to a connected downstream inner platform cooling channel with respect to a flow direction of the cooling air 252. The portion of the bypassed cooling air 252 has a less temperature than the cooling air 252 that flows through the entire upstream inner platform cooling channel to provide better cooling to the connected downstream inner platform cooling channel.

The inner platform cooling circuit and the outer platform cooling circuit use serpentine platform cooling paths to route the cooling air 252 through the inner platform 202 and the outer platform 204. The serpentine platform cooling paths may route the cooling air 252 to desired areas and discharge to desired locations on the inner platform 202 and the outer platform 204. The serpentine platform cooling paths balance the heat transfer and heat pickup of the cooling air 252 through the entire length of the serpentine platform cooling paths. The upward third inner platform pressure side cooling channel 514 has a wider width than the downward third inner platform pressure side cooling channel 516. The wider upward third inner platform pressure side cooling channel 514 has less heat transfer than the narrower downward third inner platform pressure side cooling channel 516. Therefore, the upward third inner platform pressure side cooling channel 514 keeps the cooling air 252 from getting too hot before entering the downward third inner platform pressure side cooling channel 516. The narrower downward third inner platform pressure side cooling channel 516 has increased heat transfer to maintain the cooling capacity along the inner platform pressure side mate face 236 to the very end of the downward third inner platform pressure side cooling channel 516. The splitting of the downward third outer platform pressure side cooling channel 416 into two sub downward third outer platform pressure side cooling channels 418 enhances cooling and heat transfer in comparison to a single cooling channel. The upward third outer platform pressure side cooling channel 414 has a wider width than each of the two sub downward third outer platform pressure side cooling channels 418. The wider upward third outer platform pressure side cooling channel 414 has less heat transfer than the narrower two sub downward third outer platform pressure side cooling channels 418. Therefore, the upward third outer platform pressure side cooling channel 414 keeps the cooling air 252 from getting too hot before entering the two sub downward third outer platform pressure side cooling channels 418. The narrower two sub downward third outer platform pressure side cooling channels 418 has increased heat transfer to maintain the cooling capacity along the outer platform pressure side mate face 244 to the very end of the two sub downward third outer platform pressure side cooling channels 418.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the descriptions in the present application should be read as implying that any particular element, step, act, or function is an essential element, which must be included in the claim scope. The scope of patented subject matter is defined only by the allowed claims. Moreover, none of these claims are intended to invoke a means plus function claim construction unless the exact words "means for" are followed by a participle.

What is claimed is:

1. A turbine component comprising:

an airfoil comprising a pressure side and a suction side;

a platform comprising a cold side, a hot side, a pressure side mate face, a suction side mate face, an upstream side face with respect to a direction of a working flow, and a downstream side face with respect to the direction of the working flow, the airfoil attached to the hot side of the platform;

a platform pressure side cooling circuit formed within the platform and positioned at the pressure side of the airfoil, the platform pressure side cooling circuit comprising a plurality of pressures side mate face cooling holes defined at the pressure side mate face; and a platform suction side cooling circuit formed within the platform and positioned at the suction side of the airfoil, the platform suction side cooling circuit comprising a plurality of downstream side face cooling holes defined at the downstream side face, wherein the platform pressure side cooling circuit comprises a platform pressure side impingement pocket to receive a cooling flow of the platform pressure side cooling circuit, wherein the platform pressure side cooling circuit comprises a first platform pressure side cooling channel that is disposed downstream of and in fluid communication with the platform pressure side impingement pocket, and wherein the first platform pressure side cooling channel is split into a second platform pressure side cooling channel and a third platform pressure side cooling channel, and wherein the second platform pressure side cooling channel is connected to the plurality of the pressures side mate face cooling holes to discharge the cooling flow at the pressure side mate face.

2. The turbine component of claim 1, wherein the third platform pressure side cooling channel comprises a serpentine platform cooling path comprising a first turn that turns toward the upstream side face defining an upward third platform pressure side cooling channel and a second turn that turns toward the downstream side face defining a downward third platform pressure side cooling channel.

3. The turbine component of claim 2, wherein the downward third platform pressure side cooling channel is split into two sub downward third platform pressure side cooling channels, and wherein the two sub downward third platform pressure side cooling channels are connected to the plurality of the pressures side mate face cooling holes to discharge the cooling flow at the pressure side mate face.

4. The turbine component of claim 3, wherein the platform pressure side cooling circuit comprises a plurality of platform pressure side bars that connect the two sub downward third platform pressure side cooling channels.

5. The turbine component of claim 3, wherein the platform pressure side cooling circuit comprises a plurality of platform pressure side bars that connect the upward third platform pressure side cooling channel and one of the two sub downward third platform pressure side cooling channels.

6. The turbine component of claim 3, wherein the two sub downward third platform pressure side cooling channels are parallel to each other.

7. The turbine component of claim 2, wherein the platform pressure side cooling circuit comprises a plurality of platform pressure side bars that connect the upward third platform pressure side cooling channel and the downward third platform pressure side cooling channel.

8. The turbine component of claim 2, wherein the platform pressure side cooling circuit comprises a plurality of platform pressure side bars that connect the upward third platform pressure side cooling channel and the platform pressure side impingement pocket.

9. The turbine component of claim 2, wherein the platform pressure side cooling circuit comprises a plurality of platform pressure side bars that connect the upward third platform pressure side cooling channel and the first platform pressure side cooling channel.

10. The turbine component of claim 2, wherein the upward third platform pressure side cooling channel and the downward third platform pressure side cooling channel are parallel to each other.

11. The turbine component of claim 1, wherein the platform suction side cooling circuit comprises a platform suction side impingement pocket to receive a cooling flow of the platform suction side cooling circuit.

12. The turbine component of claim 11, wherein the platform suction side cooling circuit comprises a first platform suction side cooling channel that is disposed downstream of and in fluid communication with the platform suction side impingement pocket.

13. The turbine component of claim 12, wherein the first platform suction side cooling channel is split into a second platform suction side cooling channel and a third platform suction side cooling channel, and wherein the second platform suction side cooling channel and the third platform suction side cooling channel are connected to the plurality of downstream side face cooling holes to discharge the cooling flow at the downstream side face.

14. The turbine component of claim 13, wherein the platform suction side cooling circuit comprises a plurality of platform suction side bars that connect the second platform suction side cooling channel and the third platform suction side cooling channel.

15. The turbine component of claim 13, wherein the second platform suction side cooling channel and the third platform suction side cooling channel are parallel to each other.

16. A turbine component comprising:

an airfoil comprising a pressure side and a suction side;

a platform comprising a cold side, a hot side, a pressure side mate face, a suction side mate face, an upstream side face with respect to a direction of a working flow, and a downstream side face with respect to the direction of the working flow, the airfoil attached to the hot side of the platform;

a platform pressure side cooling circuit formed within the platform and positioned at the pressure side of the airfoil, the platform pressure side cooling circuit comprising a plurality of pressures side mate face cooling holes defined at the pressure side mate face; and a platform suction side cooling circuit formed within the platform and positioned at the suction side of the airfoil, the platform suction side cooling circuit comprising a plurality of downstream side face cooling holes defined at the downstream side face, wherein the platform suction side cooling circuit comprises a platform suction side impingement pocket to receive a cooling flow of the platform suction side cooling circuit, wherein the platform suction side cooling circuit comprises a first platform suction side cooling channel that is disposed downstream of and in fluid communication with the platform suction side impingement pocket, wherein the first platform suction side cooling channel is split into a second platform suction side cooling channel and a third platform suction side cooling channel, and wherein the second platform suction side cooling channel and the third platform suction side cooling channel are connected to the plurality of downstream side face cooling holes to discharge the cooling flow at the downstream side face, and wherein the platform suction side cooling circuit comprises a plurality of platform suction side bars that connect the second platform suction side cooling channel and the third platform suction side cooling channel.

* * * * *